(12) United States Patent
Wahl

(10) Patent No.: US 10,088,012 B2
(45) Date of Patent: Oct. 2, 2018

(54) CENTRIFUGAL FORCE PENDULUM DEVICE HAVING A GUIDE ELEMENT

(71) Applicant: Schaeffler Technologies AG & Co. KG, Herzogenaurach (DE)

(72) Inventor: Peter Wahl, Woerth-Maximiliansau (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 0 days.

(21) Appl. No.: 15/300,605

(22) PCT Filed: Mar. 19, 2015

(86) PCT No.: PCT/DE2015/200174
§ 371 (c)(1),
(2) Date: Sep. 29, 2016

(87) PCT Pub. No.: WO2015/149789
PCT Pub. Date: Oct. 8, 2015

(65) Prior Publication Data
US 2017/0108077 A1    Apr. 20, 2017

(30) Foreign Application Priority Data

Mar. 31, 2014  (DE) .......................... 10 2014 206 075
Jun. 17, 2014  (DE) .......................... 10 2014 211 588

(51) Int. Cl.
*F16F 15/14*   (2006.01)

(52) U.S. Cl.
CPC .................................. *F16F 15/145* (2013.01)

(58) Field of Classification Search
CPC ...................................................... F16F 15/145
See application file for complete search history.

(56) References Cited

U.S. PATENT DOCUMENTS

| 5,619,887 A * | 4/1997 | Simpson | .................... F01L 1/16 |
| | | | 123/90.31 |
| 8,677,849 B2 * | 3/2014 | Simpson | ............. F16F 15/1421 |
| | | | 123/90.31 |
| 2013/0133476 A1 * | 5/2013 | Kremer | ................. F16F 15/145 |
| | | | 74/574.2 |

FOREIGN PATENT DOCUMENTS

| CN | 102792058 | 11/2012 | |
| CN | 103620259 | 3/2017 | |
| DE | 102004011830 A1 * | 9/2004 | ............ F16F 15/145 |
| DE | 102009037481 A1 * | 3/2010 | ............ F16F 15/145 |
| DE | 102009037481 A1 | 3/2010 | |
| DE | 102009042804 A1 | 6/2010 | |
| DE | 102011100895 A1 * | 12/2011 | .......... F16F 15/1421 |
| DE | 102011102812 A1 | 12/2011 | |
| DE | 102011004443 A1 | 8/2012 | |
| DE | 102011088925 A1 | 6/2013 | |
| DE | 102012221103 A1 | 5/2014 | |
| DE | 102014210489 A1 | 12/2014 | |
| DE | 102014216540 A1 | 3/2015 | |
| WO | 2012083920 A1 | 6/2012 | |

(Continued)

*Primary Examiner* — Vicky A Johnson
(74) *Attorney, Agent, or Firm* — Brooks Kushman P.C.

(57) ABSTRACT

A centrifugal pendulum device has a pendulum mass carrier and at least two pendulum masses that are pivotably received on it along a pendulum raceway and are adjacent circumferentially, wherein the pendulum masses are operatively coupled with one another by elastic coupling means and the elastic coupling means includes a guide element.

12 Claims, 5 Drawing Sheets

(56) References Cited

FOREIGN PATENT DOCUMENTS

| WO | WO-2012083920 A1 | * | 6/2012 | ............ F16F 15/145 |
| WO | WO-2012150401 A1 | * | 11/2012 | ........ F16F 15/12373 |
| WO | 2014005907 A1 | | 1/2014 | |
| WO | 2015036688 A1 | | 3/2015 | |

* cited by examiner

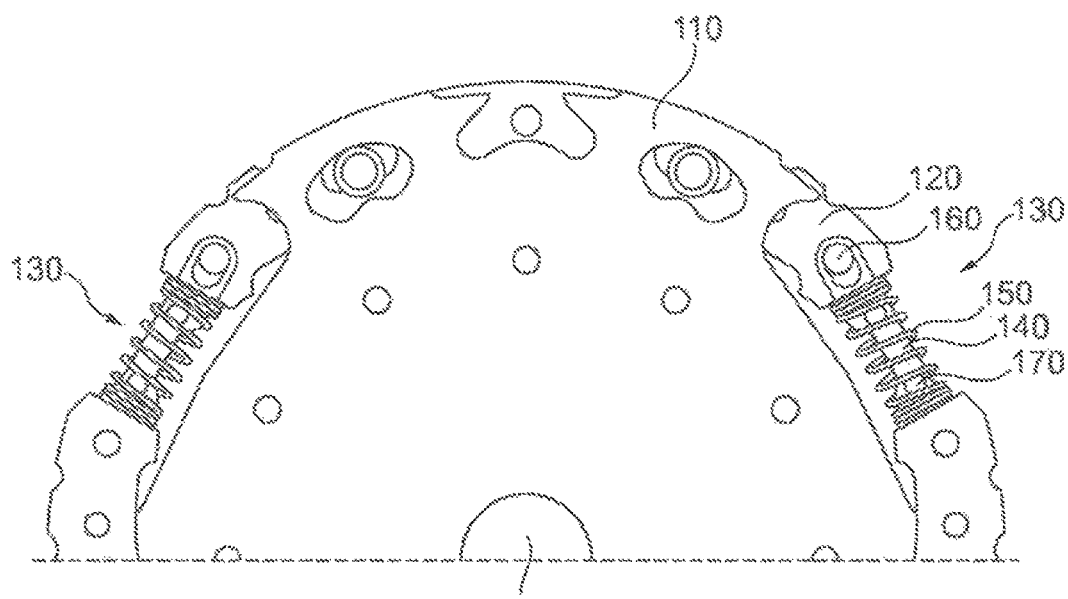
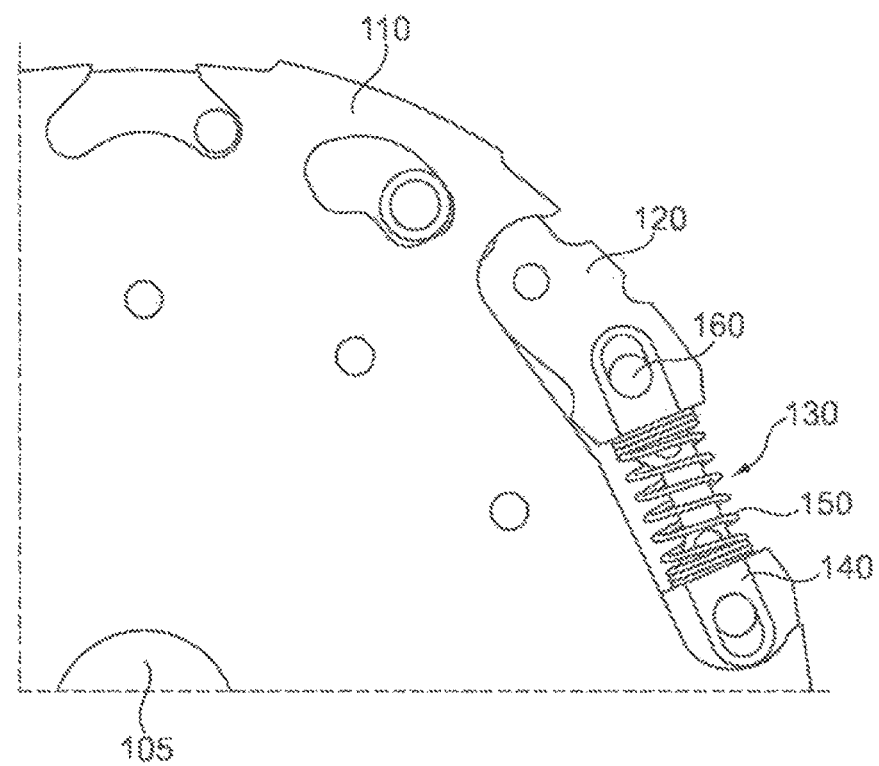
Fig. 3b

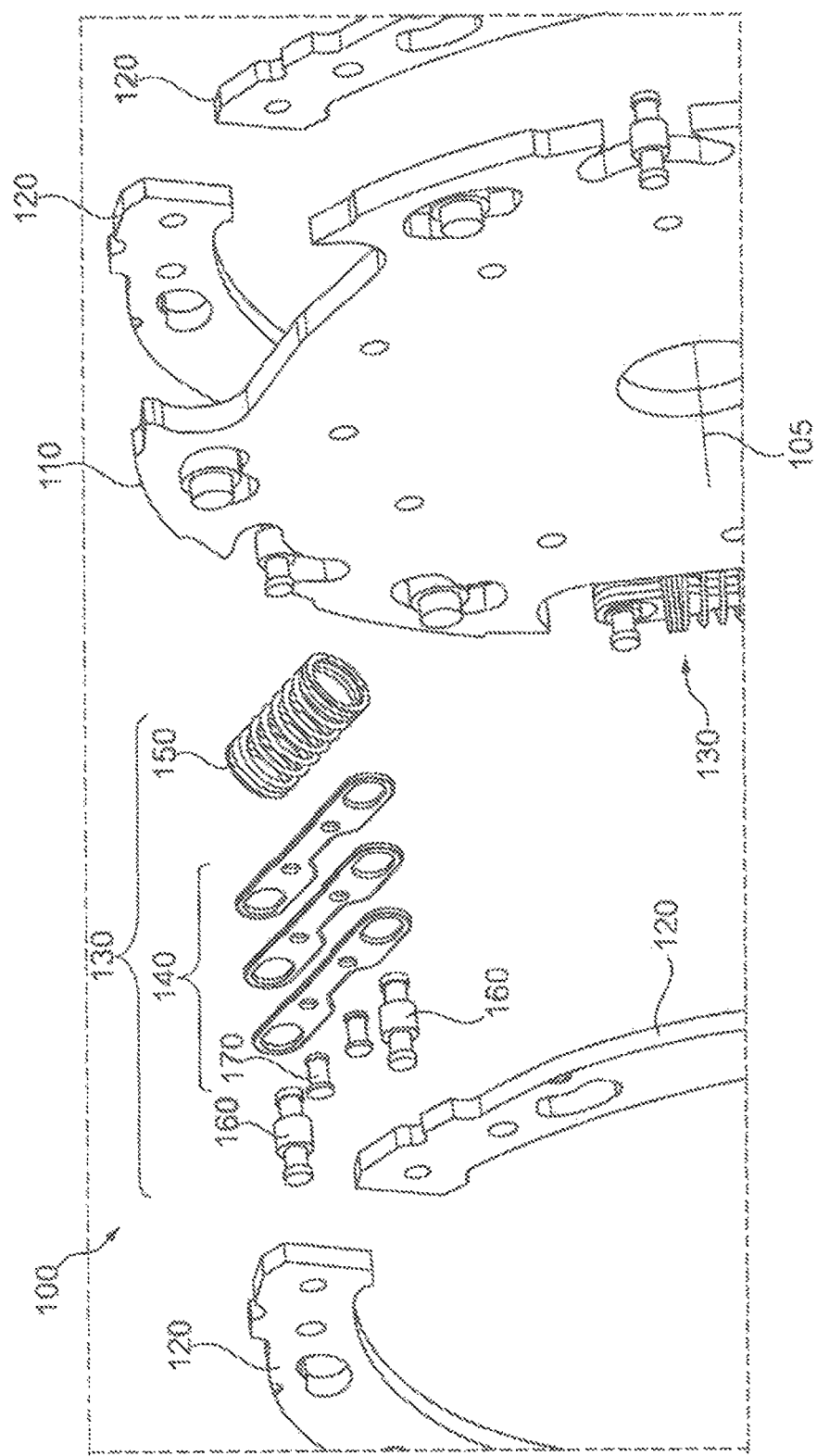

CENTRIFUGAL FORCE PENDULUM DEVICE HAVING A GUIDE ELEMENT

CROSS-REFERENCE TO RELATED APPLICATIONS

The present application is the United States National Stage Application pursuant to 35 U.S.C. § 371 of International Patent Application No. PCT/DE2015/200174, filed Mar. 19, 2015, and claims priority to German Patent Application No. 10 2014 206 075.3, filed Mar. 31, 2014 and German Patent Application No. 10 2014 211 588.4, filed Jun. 17, 2014, which applications are incorporated by reference in their entireties.

FIELD

The invention relates to a centrifugal pendulum device.

BACKGROUND

Centrifugal pendulum devices that have a pendulum mass carrier and pendulum masses are known.

SUMMARY

According to aspects illustrated herein, there is provided a centrifugal pendulum device has a pendulum mass carrier and at least two pendulum masses that are pivotably received on it along a pendulum raceway and are adjacent circumferentially, wherein the pendulum masses are operatively coupled with one another by elastic coupling means and the elastic coupling means includes a guide element.

The object of the invention is to improve the centrifugal pendulum device, in particular, to increase the reliability, reduce the load on the component, and lower the production costs.

According to the invention, this object is fulfilled by a centrifugal pendulum device as claimed. This enables the elastic coupling means to be guided radially and/or axially. It is also possible to secure the coupling means against falling out. Jamming of the coupling means can also be prevented.

The coupling means may comprise a spring element which has the form of a coil spring and extends coaxially to the guide element. In particular, the guide element may be positioned in the interior of the spring element. Longitudinal axes of the spring element and of the coupling means may run parallel to one another. This enables the spring element to be better guided through the coupling means while it compresses or expands.

The guide element may be attached to one of the pendulum masses by means of a spacing bolt, where the spacing bolt runs through an elongated hole in the guide element so that the guide element is movable on the pendulum mass in the circumferential direction. This enables the spring element to be held securely on the pendulum masses in a broad range of operating conditions. Furthermore, the guide element may serve as a stop, in order to define positions of the pendulum masses at a maximum distance from or in maximum proximity to one another.

In a more preferred embodiment, the ends of the spring element fit closely radially inside the guide element. This enables the ends of the spring element to be better held in predetermined positions relative to the pendulum masses.

The spring element preferably includes coils that are in contact with one another in the area of contact with the guide element. This makes it possible to prevent one of the coils from moving abrasively along the guide element when compressing or expanding. This makes it possible to improve the stability of the elastic coupling means.

The guide element is preferably recessed radially on the inside and/or radially on the outside in a section between the contact zones. In this way, when the centrifugal pendulum device is rotating slowly, the spring element can compress or expand without rubbing on the guide element in the area of that section. The recesses can ensure that the inward or outward mobility of a middle region of the spring element is limited to a predetermined measure.

The spring element may be fastened to the guide element on the section between the contact zones in the direction of the spring. This makes it possible to cause the guide element to remain centered in the longitudinal direction in reference to the spring element. In this way, mechanical loads can be better distributed.

In one variant, the guide element is made in a single piece. In another variant, the guide element comprises a plurality of sheet metal parts stacked together. The stacked, relatively thin sheet metal parts can be produced simply, for example by stamping. At the same time, during the stamping process, the sheet metal parts may easily be given an edge geometry that is rounded or has a chamfered form for example, so as to minimize wear due to abrasion of the spring element on the guide element.

The sheet metal parts are preferably fastened to one another. They may be fastened, for example, by means of rivets. This enables the individual parts to be better secured against shifting or misalignment.

According to another aspect of the invention, a torsional vibration damper includes the described centrifugal pendulum device.

In other preferred embodiments, the elastic coupling means may include a spring element.

The guide element may limit or damp collisions of the pendulum masses with one another.

In this case, at least part of the guide element may be accommodated in the elastic coupling means.

In addition, the guide element may be movable relative to at least one pendulum mass.

Furthermore, the guide element may be accommodated on an element assigned to the pendulum mass.

In this case, the assigned element may be a spacing bolt for fastening two pendulum masses.

The guide element may be structured in a single piece or multiple pieces.

The centrifugal pendulum device may be designed as a trapezoid pendulum having a pendulum mass that rotates depending on the swivel angle of the pendulum raceway.

A torsional vibration damper may include the centrifugal pendulum device described above.

The centrifugal pendulum device may have at least two pendulum masses spaced apart axially with a pendulum mass carrier inserted axially between them. The centrifugal pendulum device may also have one pendulum mass inserted axially between two pendulum mass carriers.

BRIEF DESCRIPTION OF THE SEVERAL VIEWS OF THE DRAWINGS

The invention will be described in detail below with reference to the illustrations. The figures show the following details:

FIG. 3a is a detail of a top view of a centrifugal pendulum device in another special embodiment of the invention;

FIG. 3b is a detail of a top view of a centrifugal pendulum device in a special embodiment of the invention with the pendulum masses in the maximally deflected state;

FIG. 4b is a detail of a three-dimensional view of the centrifugal pendulum device from FIG. 4a;

FIG. 5 is an exploded view of a centrifugal pendulum device in another special embodiment of the invention;

DETAILED DESCRIPTION

At the outset, it should be appreciated that like drawing numbers on different drawing views identify identical, or functionally similar, structural elements. It is to be understood that the claims are not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the claims.

Unless defined otherwise, all technical and scientific terms used herein have the same meaning as commonly understood to one of ordinary skill in the art to which this disclosure pertains. It should be understood that any methods, devices or materials similar or equivalent to those described herein can be used in the practice or testing of the example embodiments.

A guide element consisting of one or more sheet metal parts is hooked into the spacing bolts positioned on the pendulum masses. Because of the reduced sheet metal thickness, a plurality of stacked guide elements make small edge distances possible when stamping, and thus less construction space required for the entire guide element. In addition, the stacked variant may be joined by means of suitable methods (such as riveting) so as to secure the individual parts against shifting and/or misalignment.

In order to enable movability relative to the pendulum masses, the receiving locations, in particular bearing points, are designed as elongated holes.

Cutouts are provided in both the radially inner and radially outer areas of the guide element. These make it possible to better accommodate the elastic coupling means, in particular a spring element. The elastic coils of the spring element may be exposed, in order to reduce the friction. The inner region in particular is more exposed, so as to keep sufficient coils contact-free even at speed and with spring bending. At the same time, overarching of the spring is prevented at high speeds by the remaining link.

At low rotation speeds, the spring element is guided only at the ends of the spring, at which a sufficient number of coils are present to minimize relative movement between guide element and spring coil, and thus friction and wear.

The guide element is designed so that in the guidance zone the spring element is adequately braced but at the same time remains easily movable axially. In addition, the edges of the guide element are stamped or gripped and/or rounded in the area of the spring guidance.

To guarantee centering of the guide element between the pendulum masses, it is possible in addition to hook the spring element into the middle area, and thus enable it to be driven positively.

Figure 7:
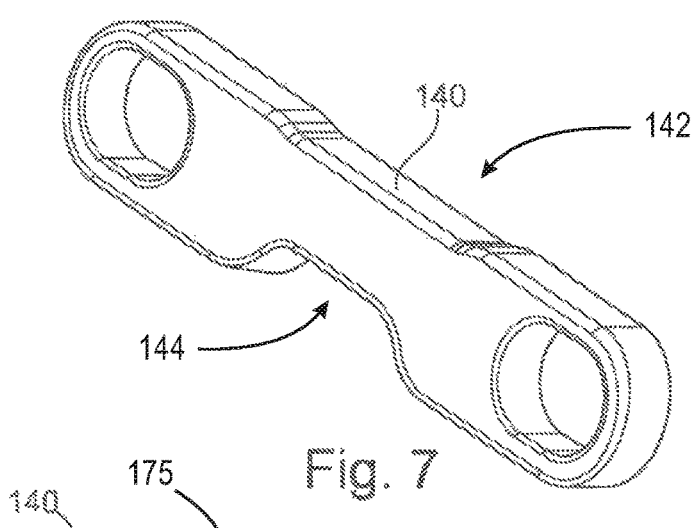
FIG. 7 is a guide element in another special embodiment of the invention.

As depicted in FIGS. 1 through 5 and 8, the guide element may be constructed of multiple pieces. A one-piece variant is also conceivable, for example forged, sintered or consisting of injection molded plastic or aluminum, and a variant of a one-piece guide element is shown in FIG. 7.

Figure 8:
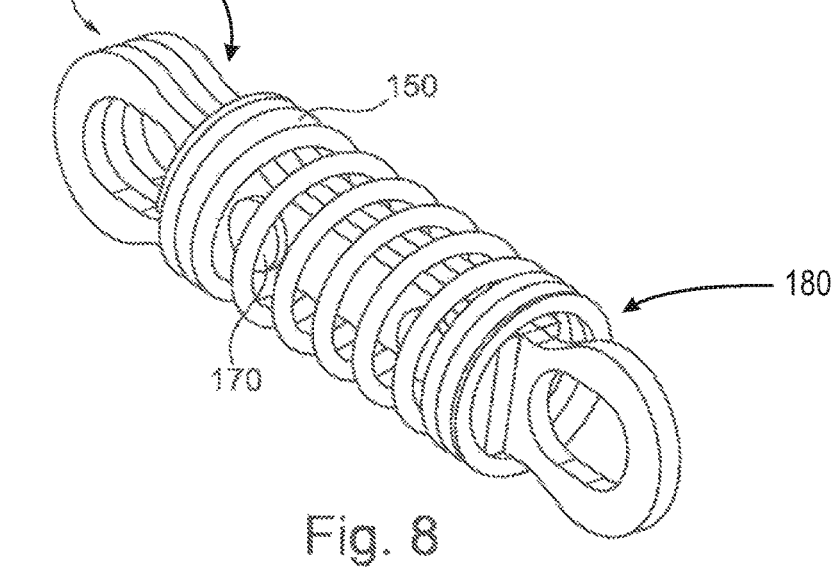
FIG. 8 is a guide element in another special embodiment of the invention.

FIG. 8 depicts a reinforced variant having asymmetrical individual parts (because of spring assembly). The riveting in this case can be carried out with the spring element compressed.

Figure 1:
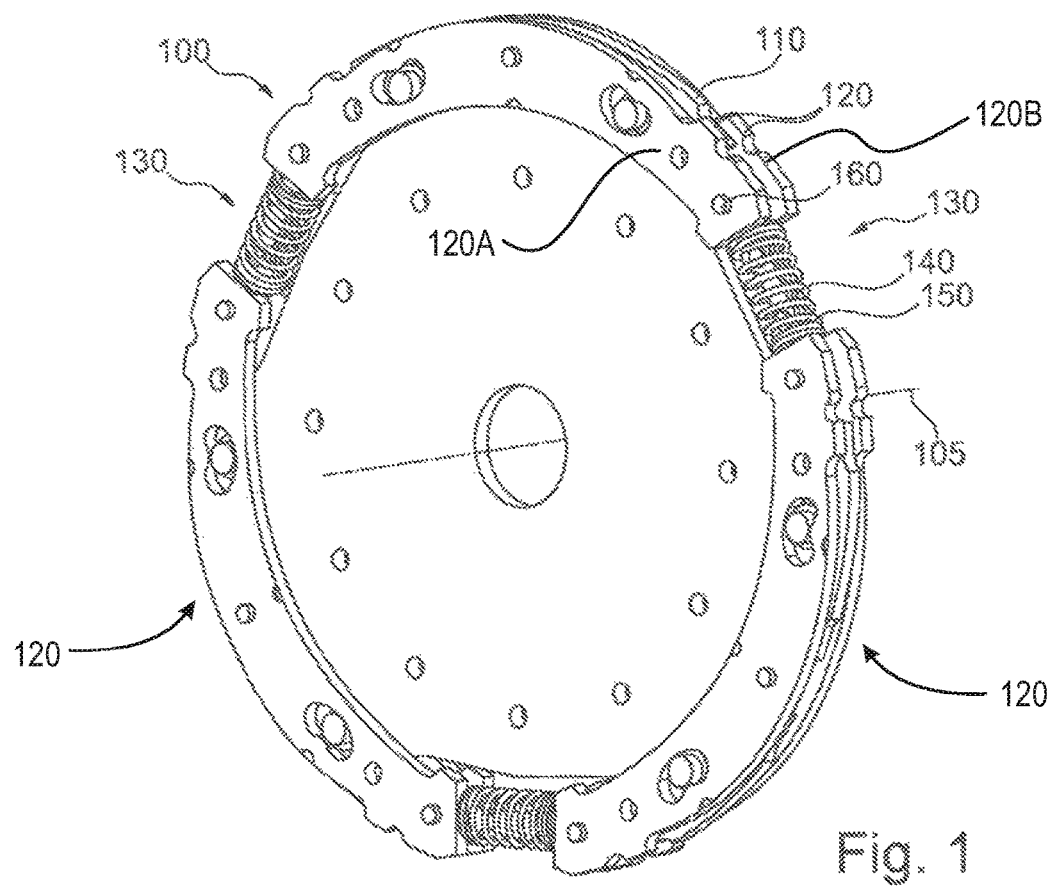
FIG. 1 is a three-dimensional view of a centrifugal pendulum device in a special embodiment of the invention.

FIG. 1 shows a centrifugal pendulum device 100. The centrifugal pendulum device 100 is mounted rotatably around an axis of rotation 105, and includes a pendulum mass carrier 110 to which two or more pendulum masses 120 are attached. In the depicted embodiment, each pendulum mass 120 comprises two pendulum elements, 120A and 120B, which are attached on different axial sides of the pendulum mass carrier 110 and are connected to each other. Between pendulum masses 120, which are adjacent on a perimeter around the axis of rotation 105, there is in each case a coupling means 130, which includes in each case a guide element 140 and a spring element 150. Ends of the guide element 140 with different pendulum masses 120 are each preferably attached by means of a spacing bolt 160, which runs parallel to the axis of rotation 105 through corresponding cutouts in the pendulum masses 120.

The pendulum masses 120 are attached movably to the pendulum mass carrier 110 in a known way, in order to make together with the pendulum mass carrier 110 a centrifugal pendulum to eliminate non-uniformities of rotation around the axis of rotation 105. The spring elements 150 of the coupling means 130 provide a predetermined return force between the pendulum masses 120. The guide elements 140 serve to guide the spring elements 150. This makes it possible to prevent a spring element 150 from buckling, being jammed between the mass ends of individual coils, being broken or even thrown out of the centrifugal pendulum device 100 at a high rotational speed around the axis of rotation 150.

Figure 2A:
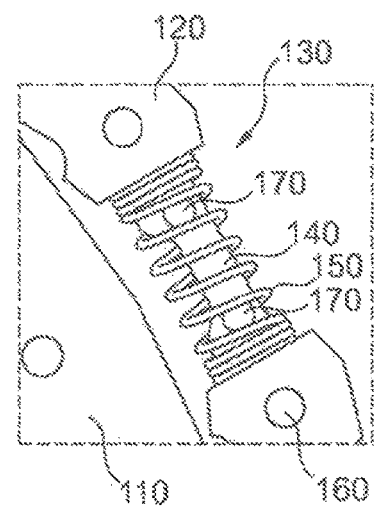
FIG. 2a is a detail of a three-dimensional view of the centrifugal pendulum device from FIG. 1.
Figure 2B:
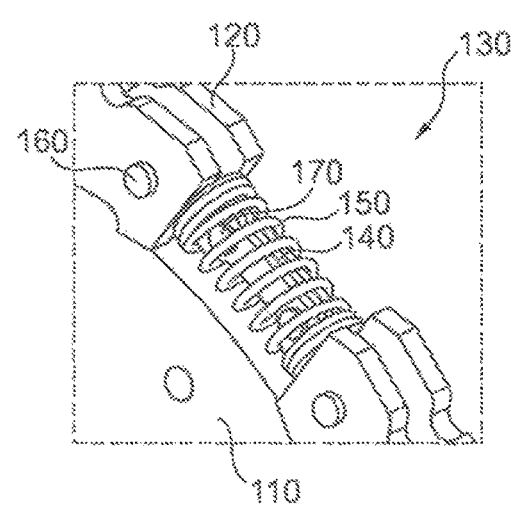
FIG. 2b is a detail of another three-dimensional view of the centrifugal pendulum device from FIG. 1.

FIGS. 2a and 2b show the coupling means 130 of FIG. 1 in detail. The spring element 150 is preferably designed as a coil spring, in particular in straight cylindrical form, and is coaxial to the guide element 140. In this case, the guide element 140 is preferably accommodated in the interior of the spring element 150.

At its ends, the spring element 150 has coils that are in contact with each other. The relative spacing of adjacent coils does not change as the spring element 150 compresses or expands. Furthermore, it is preferred that the end areas of the spring element 150 are in contact with the guide element 140. It is further preferred that the contact exists on at least two points, one of which faces the axis of rotation 105. In the present embodiment, the end of the spring element 150 is in contact radially inside and radially outside with the guide element 140, relative to its own longitudinal axis. Furthermore, the end face, i.e. in the circumferential direction around the axis of rotation 105, is in contact with the pendulum mass 120.

The guide element 140 may be structured in a single piece or multiple pieces. In the depicted embodiment, the guide element 140 comprises a plurality of metal sheets, which are stacked together and preferably fastened to one another. In the present case, the fastening is carried out by mean of two rivets 170, which pass through the individual sheets. Advantageously, the individual sheets may be produced cost-effectively, for example by means of stamping. Furthermore, in the course of the manufacturing process, a sharp edge can be avoided, against which a section of the spring element 150 could otherwise rub.

The guide element 140 preferably has in a middle section at least one indentation, in order to increase free movability of the spring element 150. The dimensions of the indentation may be such that bending of the spring element 150 radially inward or outward relative to the axis of rotation is limited. The indentation is preferably located between zones at which ends of the spring element 150 are in contact with the guide element 140.

FIGS. 3a and 3b show an axial view of the centrifugal pendulum device 100 in which an element of the pendulum mass 120 which faces the observer is removed in each of the illustrations. Thus it can be seen that the spacing bolt 160 on the guide element 140 passes through an elongated hole which permits movability of the spacing bolt 160 in the spring direction of the spring element 150. Elongated holes are preferably inserted at both ends of the guide element 140. This enables setting of both a maximum and a minimum spacing of the pendulum masses 120 joined together by means of the coupling means 130.

Figure 4A:
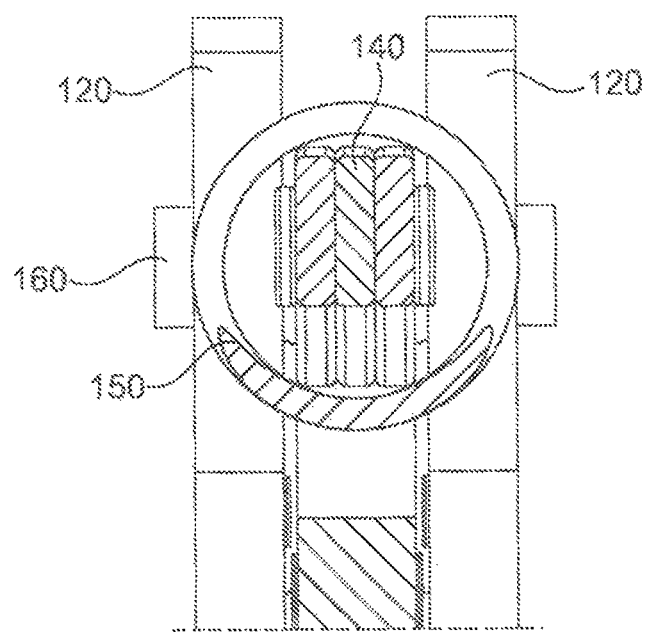
FIG. 4a is a detail of a cross-sectional view of a centrifugal pendulum device in another special embodiment of the invention.
Figure 4B:
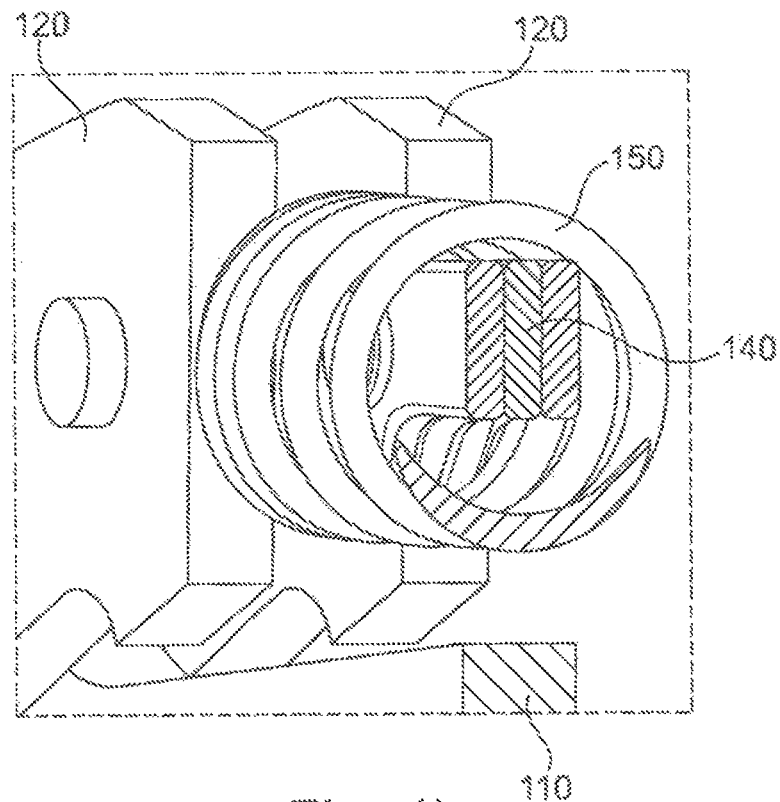

FIGS. 4a and 4b show sectional views of the centrifugal pendulum device 100 in the area of the coupling means 130. It becomes clear how an axial end of the spring element 150 is in contact with the guide element 140 on its radially inner side. In the depicted embodiment, the spring element 150 is in contact with the guide element 140 at two radially inner and two radially outer points, relative to the axis of rotation 105. The spring element 150 can be held on the guide element 140 with a clamping fit. It is preferred that the spring element 150 have coils that are touching each other in the area in which it is in contact with the guide element 140, so that they do not move in relation to the guide element 140 when the spring element 150 is compressed or expanded.

Between the regions where the spring element 150 is in contact with the guide element 140, the guide element 140 is preferably shaped so that the spring element 150 is spaced apart from the guide element 140 on all sides around the axis of rotation 105 without the influence of centrifugal forces. Indentations, in particular on the side facing toward the axis of rotation 105 and facing away from the axis of rotation 105, can guarantee this. The indentation facing the axis of rotation 105 is preferably greater than the indentation facing away from the axis of rotation 105, so that a predetermined bending of the spring element 150 is made possible under centrifugal force when the centrifugal pendulum device 100 rotates around the axis of rotation 105.

FIG. 5 shows an exploded view of the centrifugal pendulum device 100 of the preceding figures, in another embodiment. The coupling means 130 is preferably assembled before the elements of the pendulum mass 120 which are positioned opposite one another relative to the pendulum mass carrier 110 are fastened to one another. To this end, the spring element 150 is pushed axially onto the guide element 140. In the depicted embodiment, the guide element 140 is produced beforehand from a plurality of sheet metal elements stacked together, by fastening them to one another preferably by means of rivets 170.

Figure 6:
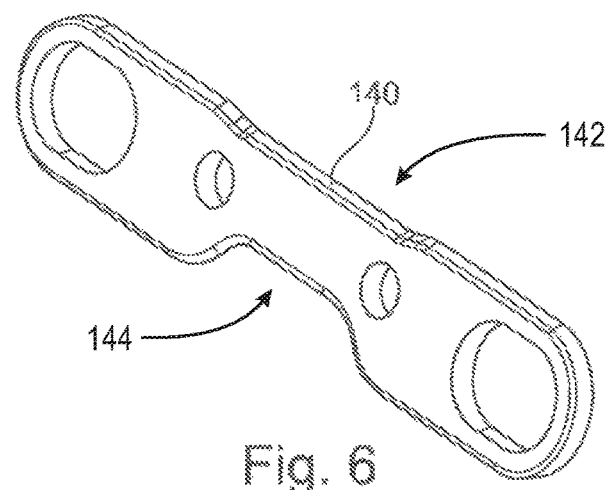
FIG. 6 is a guide element in a special embodiment of the invention.

FIG. 6 shows a sheet metal element, a plurality of which form a guide element 140 in the embodiment in FIG. 5. Guide element 140 may comprise indentation 142 on a radially outer side and/or indentation 144 on a radially inner side.

As an alternative to this, FIG. 7 shows a one-piece guide element 140.

FIG. 8 shows a multi-piece guide element 140 similar to the embodiment depicted in FIG. 5. In the depicted embodiment, an elongated hole is formed at only one end of each of the sheet metal elements. Guide element 140 comprises contact region 175 and contact region 180. Contact regions 175 and 180 are the areas where contact between spring element 150 and guide element 140 occur.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

The invention claimed is:

1. A centrifugal pendulum device, comprising:
a pendulum mass carrier; and,
at least two pendulum masses pivotably received on the pendulum mass carrier along a pendulum raceway and adjacent circumferentially, each pendulum mass including:
a first pendulum element arranged on a first axial side of the pendulum mass carrier; and,
a second pendulum element arranged on a second axial side of the pendulum mass carrier, opposite the first axial side;
wherein:
the pendulum masses are operatively coupled with one another by means of elastic coupling means;
the elastic coupling means includes a guide element; and
the coupling means includes a spring element that is designed as a coil spring and extends coaxially to the guide element.

2. The centrifugal pendulum device of claim 1, wherein the guide element is attached to one of the pendulum masses by means of a spacing bolt and the spacing bolt passes through an elongated hole in the guide element, so that the guide element is movable in the circumferential direction on the pendulum mass.

3. The centrifugal pendulum device of claim 2, wherein ends of the spring element are in contact with the guide element radially on an inside thereof.

4. The centrifugal pendulum device of claim 1, wherein the guide element is attached to one of the pendulum masses by means of a spacing bolt and the spacing bolt passes through an elongated hole in the guide element, so that the guide element is movable in the circumferential direction on the pendulum mass.

5. The centrifugal pendulum device of claim 1, wherein ends of the spring element are in contact with the guide element radially on an inside thereof.

6. The centrifugal pendulum device of claim 5, wherein the spring element includes coils that are touching one another in an area where it is in contact with the guide element.

7. The centrifugal pendulum device of claim 5, wherein the guide element is indented radially on an inside thereof or radially on an outside thereof in a section between first contact region between the spring element and the guide element and a second contact region between the spring element and the guide element.

8. The centrifugal pendulum device of claim 7, wherein the spring element is attached to the guide element on the section between the first and second contact regions in a direction of the spring.

9. The centrifugal pendulum device of claim 1, wherein the guide element includes a plurality of sheet metal parts stacked together.

10. The centrifugal pendulum device of claim 9, wherein the sheet metal parts are fastened to one another.

11. A centrifugal pendulum device, comprising:
a pendulum mass carrier; and,
at least two pendulum masses pivotably received on the pendulum mass carrier along a pendulum raceway and adjacent circumferentially, wherein:
the pendulum masses are operatively coupled with one another by means of elastic coupling means; and,
the elastic coupling means includes a guide element, wherein the guide element is attached to one of the pendulum masses by means of a spacing bolt and the spacing bolt passes through an elongated hole in the guide element, so that the guide element is movable in the circumferential direction on the pendulum mass.

12. A centrifugal pendulum device, comprising:
a pendulum mass carrier; and,
at least two pendulum masses pivotably received on the pendulum mass carrier along a pendulum raceway and adjacent circumferentially, wherein:
the pendulum masses are operatively coupled with one another by means of elastic coupling means; and,
the elastic coupling means includes a guide element, wherein the guide element includes a plurality of sheet metal parts stacked together.

* * * * *